H. F. HAMMOND.
SOLDERING IRON.
APPLICATION FILED JAN. 21, 1921.
1,422,357.
Patented July 11, 1922.
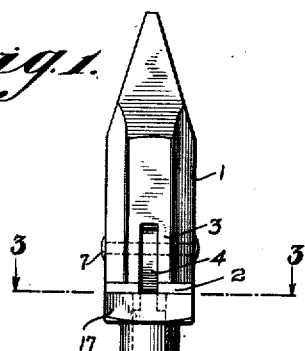
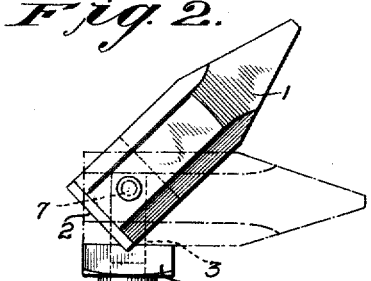
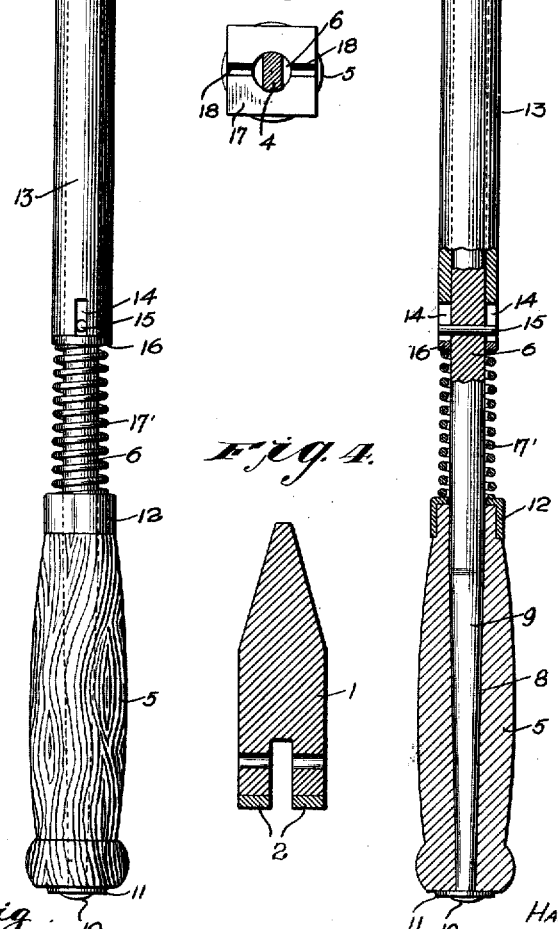
WITNESSES
INVENTOR
HARRY F. HAMMOND
BY
ATTORNEYS

UNITED STATES PATENT OFFICE.

HARRY F. HAMMOND, OF SOUTH SHAFTSBURY, VERMONT, ASSIGNOR OF ONE-HALF TO JOHN ALFRED DAVIS, OF DOVER, VERMONT.

SOLDERING IRON.

1,422,357. Specification of Letters Patent. Patented July 11, 1922.

Application filed January 21, 1921. Serial No. 438,963.

*To all whom it may concern:*

Be it known that I, HARRY F. HAMMOND, a citizen of the United States, and a resident of South Shaftsbury, in the county of Bennington and State of Vermont, have invented a new and Improved Soldering Iron, of which the following is a full, clear, and exact description.

This invention relates to improvements in soldering irons, an object of the invention being to provide a soldering iron having an improved connection between the iron proper and the shank or handle supporting the same, whereby the iron may be located in alignment with the shank or handle or at different angles relative to the shank and handle and be firmly supported in any of its positions of adjustment.

A further object is to provide a soldering iron in which the iron is elastically secured in its different positions of adjustment so that it may be manually shifted from one position to the other and automatically held in any position of adjustment.

With these and other objects in view the invention consists in certain novel features of construction, and combinations and arrangements of parts, as will be more fully hereinafter described and pointed out in the claims.

In the accompanying drawings—

Figure 1 is a view in side elevation illustrating my improved soldering iron.

Figure 2 is a view partly in longitudinal section and partly in elevation, the view being at right angles to Figure 1, showing the iron in different positions of adjustment.

Figure 3 is a view in transverse section on the line 3—3 of Figure 1.

Figure 4 is a view in longitudinal section through the iron 1.

1 represents my improved soldering iron which is provided with a relatively flat inner end 2 and with a longitudinal recess 3 in its flat inner end. The flat end 2 of the iron may be formed by securing steel or other hard metal plates to the relatively soft metal of the iron as clearly shown in Figure 4, so as to sustain the necessary wear to which the end of the iron is subjected. In the recess 3 the outer flat end 4 of a shank 6 is pivotally connected by means of a rivet 7, said rivet passing through the iron and through the flattened end 4 of the shank 6 and preferably spaced an equal distance from the end of the iron and from the sides of the iron, the sides of the iron being substantially flat as indicated.

The shank 6, above referred to, is, throughout the main portion of its length, of general cylindrical form and at its free end is provided with a handle 5. This handle 5 has a longitudinal conical bore 8 to receive the conical or tapering end 9 of shank 6 and said end of the shank 6, where it projects through the handle 5, is upset forming a head 10 and a washer 11 is interposed between the head 10 and the end of the handle 5. A ferrule 12 is positioned around the shank 6 and over the end of the handle 5. While I have illustrated and described the particular manner of securing the handle and shank together, it is obvious that this is a matter of detail which may be varied to suit conditions and I do not wish to be limited to the exact structure set forth.

A sleeve 13 is mounted in the shank 6 and is provided near one end with aligned slots 14 receiving the ends of a pin 15, the latter projected through the shank 6 and operating to limit the longitudinal movement of the sleeve on the shank, as will be readily understood. A washer 16 is located at the inner end of the sleeve 13 and a coil spring 17' is positioned around the shank 6 and interposed between the washer 16 and the ferrule 12 exerting an outward pressure on the sleeve 13.

This sleeve 13 is provided at its outer end with a relatively flat head 17 of approximately the same surface area as the flat end 2 of the iron 1, and when the iron is in one position, as shown in Figure 1, this head 17 is maintained against the end of the iron to hold the iron in alignment with the shank. The head 17 is provided centrally and at opposite sides of its outer face with bevelled notches 18 to receive the corners of the iron 1 when the latter is moved to a position at an angle of forty-five degrees to the shank, as clearly shown in Figure 2, and it is obvious that the iron may be swung to either side of the shank and be held with equal efficiency in such position by reason of the engagement of the corner of the iron with the notches 18. When the iron is swung to a position at right angles, or ninety degrees to that of the shank, the head 17 will engage the flat side of the iron and hold the iron in this position. The iron can be readily forced from one position to another and be maintained in such position by its engagement with the head 17 and such engagement will be sufficient to prevent accidental movement of the iron relative to the shank. The movement of the iron from one position to another is compensated for by the longitudinal movement of the sleeve 13 on the shank 6 and the spring 17' operates to maintain the head 17 in operative engagement with the iron in all positions of adjustment.

It will, therefore, be noted that with my improved iron I am enabled not only to firmly hold the iron in a position in alignment with the shank, but I am also enabled to support the iron at an angle to the shank, and in doing various kinds of work it is a source of great convenience to so position the iron relative to the shank instead of maintaining the iron always in alignment with the shank as there are occasions in doing work where it is necessary to avoid obstructions and to carry on the soldering operations in awkward places. It is, therefore, possible with my improved iron to so adjust the iron relative to the shank as to conveniently carry out any ordinary soldering operation.

Various slight changes and modifications might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A device of the character stated, comprising a soldering iron, a shank pivotally connected to the soldering iron, a spring pressed sleeve on the shank, and a head on the sleeve having a flat outer surface adapted to engage the end of the iron and support the same in alignment with the shank, and said head having notches in its outer face adapted to receive the corners of the iron and support the iron at an angle to the shank.

2. A device of the character stated, comprising a soldering iron having a flat inner end and a recess in its inner flat end, a shank pivotally secured in the recess in the iron, a spring pressed sleeve on the shank, a flat head on the outer end of the sleeve, and notches in the head, said flat head with the notches therein adapted to hold the iron either in alignment with the shank at an angle of forty-five degrees relative thereto or at an angle of ninety degrees relative thereto.

HARRY F. HAMMOND.